United States Patent [19]

Conery et al.

[11] 3,730,215
[45] May 1, 1973

[54] DIAPHRAGM CONTROLLED AIR RELIEF VALVE

[75] Inventors: William J. Conery; Donald A. Kaessen, both of Ashland, Ohio

[73] Assignee: Hydr-O-Matic Pump Company, Hayesville, Ohio

[22] Filed: Apr. 8, 1971

[21] Appl. No.: 132,422

[52] U.S. Cl. ............. 137/494, 137/505.13, 251/54
[51] Int. Cl. ............................................. G05d 16/00
[58] Field of Search ............ 137/494, 484.2, 484.4, 137/498, 505.46, 505.13; 417/299, 311, 302; 251/45, 54, 36, 48

[56] References Cited

UNITED STATES PATENTS

| 1,701,185 | 2/1929 | Heldeman | 251/54 X |
| 2,189,750 | 2/1940 | Barge | 137/505.13 X |
| 2,301,031 | 11/1942 | Ferguson | 137/505.13 X |
| 2,571,433 | 10/1951 | Fine et al. | 137/505.13 X |
| 929,007 | 7/1909 | Phillips | 251/48 |
| 984,874 | 2/1911 | Winton | 251/54 X |
| 2,526,972 | 10/1950 | Ray | 137/505.13 X |

FOREIGN PATENTS OR APPLICATIONS

| 19,537 | 10/1934 | Australia | 137/505.13 |
| 90,775 | 4/1959 | Netherlands | 137/505.13 |
| 904,624 | 2/1954 | Germany | 137/505.13 |
| 85,677 | 2/1936 | Sweden | 137/505.13 |
| 140,790 | 2/1935 | Austria | 137/505.13 |
| 946,700 | 8/1956 | Germany | 251/54 |

*Primary Examiner*—Henry T. Klinksiek
*Assistant Examiner*—Robert J. Miller
*Attorney*—Oldham & Oldham

[57] ABSTRACT

A valve for venting of air from the pumping chamber of a liquid pumping system. The valve assembly includes a valve casing having a through chamber with a valve seat and a valve head which is normally maintained on the downstream side of the valve seat in spaced relation therefrom and which is connected to a valve stem extending through the valve seat. A flexible diaphragm is attached to the valve stem on the upstream side of the valve seat. Under low pressure, low volume flow or no flow conditions the valve remains in open position. As the flow rate increases, increased pressure on the diaphragm forces the valve stem in the upstream direction, bringing the valve head into closing contact with the valve seat.

3 Claims, 3 Drawing Figures

Patented May 1, 1973 3,730,215

INVENTORS
WILLIAM J. CONERY
DONALD A. KAESSEN
BY
Oldham & Oldham
ATTORNEYS.

DIAPHRAGM CONTROLLED AIR RELIEF VALVE

In impeller type pumps, the presence of air in the pumping chamber can prevent priming of the pump. This is especially true when the pump must operate against a substantial back pressure. In such situations some means must be provided to vent the air from the pump chamber. These means may include manually controlled valves or externally controlled automatic valves. Such arrangements are inefficient as they require either the presence of an operator or a control system.

It is the primary object of the present invention to provide an air relief valve for a pump which valve is automatic in its operation and which is self-contained, requiring no external control.

It is also an object of the invention to provide an air relief valve which provides reliable operation.

Another object of the invention is a provision of an air relief valve for a pumping system which valve is of a simple and trouble free design.

Yet another object of the invention is a provision of an air relief valve for a pumping system in which the operating pressure level of the valve may be adjusted without requiring the disassembly of the valve structure.

The above and other objects and advantages of the invention which will become apparent in the following detailed description are achieved by providing an air relief valve assembly which consists, essentially, of a valve housing having inlet and outlet ports and a circular valve seat intermediate said ports, a valve head adapted to have sealing engagement with the valve seat, a valve stem extending from the head through the region of the valve seat, spring means for normally urging the valve stem and valve head into an open relation relative to the valve seat, and a flexible diaphragm connected to the valve housing and to the valve stem to move the valve stem and valve head upon increased pressure to bring the valve head into sealing engagement with the valve seat.

For a more complete understanding of the invention and the objects and advantages thereof reference should be had to the following detailed description and the accompanying drawings wherein there is shown a preferred embodiment of the invention.

Figure 1:
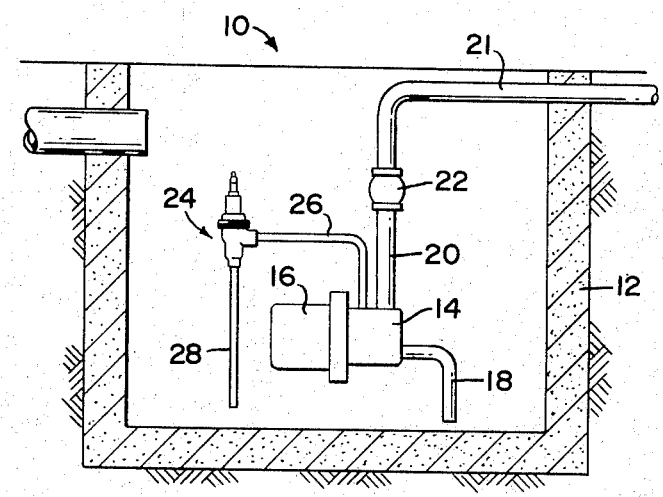
FIG. 1 is a schematic side elevational view of a sump pump arrangement employing the air relief valve of the present invention.

One of the uses of the air relief valve of the present invention is in conjunction with a sump pumping arrangement such as may be used in a sewage system. Such an arrangement is designated generally by the reference numeral 10 of FIG. 1 and includes a sump 12 which serves to collect sewage or other liquid. An impeller type pump 14 driven by a motor 16 has an inlet 18 for drawing liquid from the sump. The pump 14 may be supported in any suitable manner. The pump discharges the liquid through a discharge pipe 20 which may, for example, be connected to a discharge main 21 of a sewage system. The system includes a check valve 22 to prevent the reverse flow of sewage or other liquid from the main 21 into the sump 12. The motor is operated by suitable controls, not shown, which may consist of a level actuated switch which starts the motor 16 whenever the liquid level in the sump rises above a predetermined upper limit and stops the motor 16 whenever the liquid level drops below a predetermined lower limit. In the event the pumping chamber of the pump 14 becomes fully or partially filled with air when the pump is not operating, the pump will not be self priming when it is next started up. The combination of the check valve 22 and the pressure in the main 21 produce substantial back pressure on the discharge line 20 of the pump 14 to prevent the expulsion of the air entrapped in the pumping chamber. In order to overcome this difficulty the present invention provides an air relief valve 24 which is connected by a suitable auxiliary conduit 26 operatively connected to the discharge port of the pump 14. The valve may be provided with a discharge pipe 28 for returning any fluid passing through the valve 24 to the sump 12. As will be explained in more detail below, the valve 24 is normally open and remains open until the pump output pressure rises above a certain level. Thus, the valve 24 permits the pump 14 to begin operating with little or no back pressure and thus permits the complete venting of any air from the pumping chamber.

Figure 2:
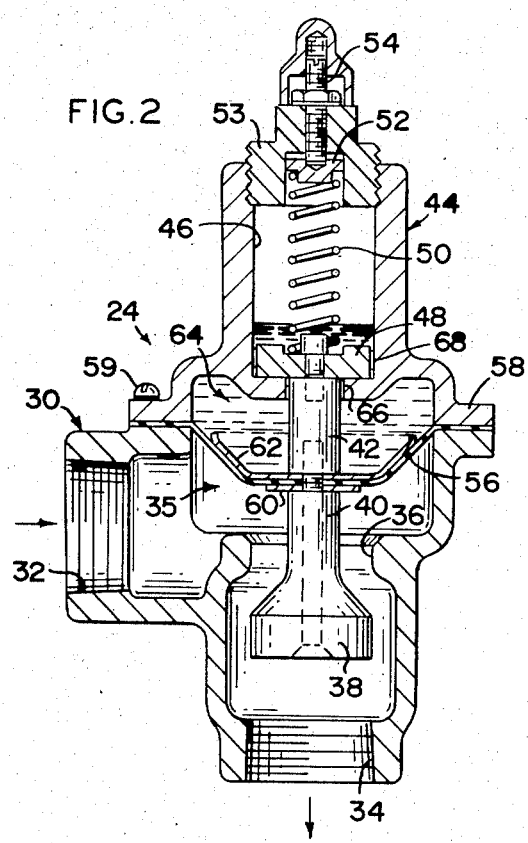
FIG. 2 is a sectional view of the air relief valve of the present invention, showing the valve in its open position.
Figure 3:
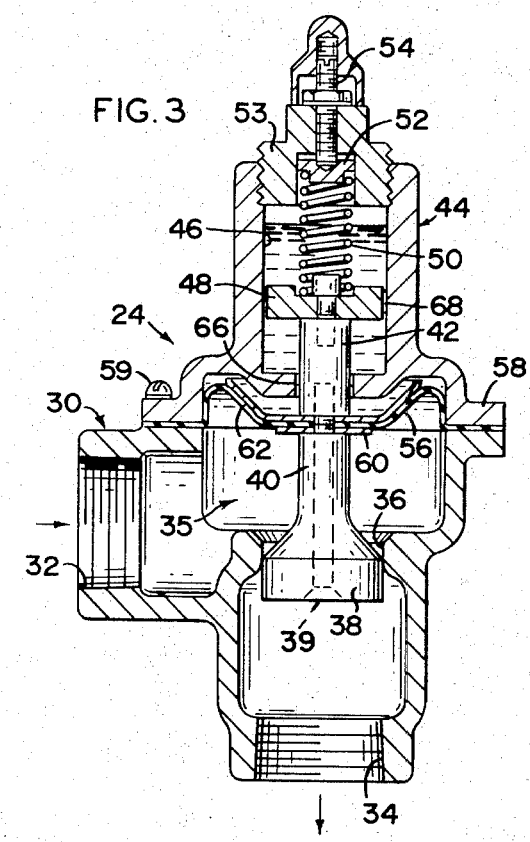
FIG. 3 is a view similar to that of FIG. 2 but showing the valve in its closed position.

The air relief valve 24 of the present invention is illustrated in FIGS. 2 and 3. A valve casing 30 has inlet and outlet ports 32 and 34, respectively, and a through chamber 35 connecting the inlet and outlet ports. Intermediate the inlet and outlet ports the walls of the valve casing 30 define an annular valve seat 36. A valve head 38 is carried by a stem 40 and adapted to be brought into and out of engagement with the annular valve seat 36 to close or open the through passage 35 of the valve casing 30. As can be seen from the drawings, the valve stem 40 extends axially through the valve seat region 36 and includes an upper stem portion 42. The upper portion 42 of the valve stem 40 is slidably received in a housing 44 which is secured to the valve casing 30. The housing 44 includes a cylindrical bore 46 and a piston 48 is affixed to the upper end of the valve stem portion 42 and is slidably received in the bore 46. A coil spring 50 is provided between the piston 48 and a retaining block 52 slidably carried in the cap 53 sealing the upper end of the bore 36. This spring serves to bias the piston 48, valve stem 40, 42 and valve head 38 downwardly into the open position, as is shown in FIG. 2. Preferably, an adjustment screw 54 is provided in the end cap 53 for regulating the position of the retaining block 52 and, hence, the amount of downward pressure exerted on the valve stem assembly by the coil spring 50.

A flexible diaphragm 56 has its periphery secured between the valve casing 30 and the flanges 58 of the housing 44, the bolts or screws 59 which secure the housing 44 to the casing 30 serving to clamp the periphery of the diaphragm 56 in place. The center of the flexible diaphragm 56 is connected to the valve stem assembly, being retained by washers 60 and 62 between the lower and upper valve stem portions 40 and 42, respectively. Preferably, the washer 62 is cup-shaped to provide support for the flexible diaphragm 56. The chamber 64 which is formed between the flexible diaphragm 56 and the housing 44 is preferably filled with oil. The bore 66 in the housing 44 through which the upper valve stem portion 42 extends is of slightly greater diameter than the diameter of the valve stem portion 42 so that a small passage is provided for the oil in the chamber 64. Likewise, the piston 48 is of a slightly smaller diameter than the bore 46 to provide a passage 64 permitting the flow of oil around the sides of the piston 48.

As shown in FIG. 2, when there is no pressure at the inlet port 32 the coil spring 50 forces the valve stem assembly 40, 42 and valve seat 38 downwardly into a position remote from the valve seat 36 thus opening the through passage 35 from the inlet port 32 to the outlet port 34. Fluid may now flow freely through the valve. As the liquid flow rate through the valve increases pressure against the lower side of the flexible diaphragm 56 also increases and, when this pressure becomes sufficient to overcome the spring 50, the flexible diaphragm forces the valve stem assembly 40, 42 upwardly, bringing the valve head 38 into engagement with the valve seat 36 to block flow through the valve. As the diaphragm 56 is forced upwardly, the oil in the chamber 64 is forced through the bore 66 surrounding the upper valve stem portion 42. The viscosity of the oil and the amount of clearance between the upper valve stem portion 42 and the bore 66 determine the rate at which the oil flows upwardly from the chamber 64 to the bore 46. This arrangement provides a delaying action for the valve closing, a typical delay being from ½ to 1 minute.

When the valve 24 is employed in the pumping system of FIG. 1, the valve will be in its open position when the pump is not operating since there is no pressure in the conduit 26 or the inlet portion 32. As the pump begins operation, fluid flow will be primarily through the conduit 26 since the check valve 22 and the pressure in the main 21 will provide back pressure in the pump discharge line 20. Thus, the initial flow from the pump 14 is through the valve 24 and the pipe 28 to return to the sump. This is an open path with little back pressure and, as a result, the pump 14 is able to discharge any air which may have become entrapped in the pumping chamber. As the pump continues operating, pressure in the conduit 26 increases causing the valve 24 to gradually close. The time delay of the valve assures that closing does not occur until a sufficient time has been allowed to fully vent any air from the chamber of the pump 14. During subsequent operation of the pump, the valve 24 is held closed by the pressure on the diaphragm 56 and the pump discharges through the discharge pipe 20, check valve 22 and discharge main 21. When the pump 14 is stopped the valve 24 again opens as the coil spring 50 is no longer opposed by fluid pressure transmitted through the diaphragm 56. The dashpot arrangement comprised of the bore 46, piston 48, bore 66 and chamber 64 again serves to control the rate of action of the valve. The dashpot arrangement further serves to prevent the valve from opening or closing as a result of rapid pump output pressure fluctuations.

The valve head 38 is secured to the stem 42 as by a capscrew 39 which secures the washers 60 and 62 between the ends of the stem and valve head and against the diaphragm 56. A slight leakage path may be provided to allow pressure decay in a completely tight pumping system to remove the pressure from the diaphragm 56 nd allow the valve to open when the pump 14 is stopped. This can be achieved in several well known ways as having the valve head 38 slightly smaller than its annular seat or bore 36, or if the valve head 38 is larger than its annular seat 36, a small slot may be provided across the seating surface of either or both parts.

It will be understood that while only the best known embodiment of the invention has been described and illustrated in detail herein, the invention is not limited thereby or thereto. Reference should therefore be had to the appended claims in determining the true scope of the invention.

What is claimed is:

1. An air relief valve for a pumping system, comprising:
    a valve casing having inlet and outlet ports connected by a through chamber;
    a valve seat on the walls of the through chamber and intermediate the inlet and outlet ports;
    a valve stem slidably received in a first bore in the valve casing on the upstream side of the valve seat, the valve stem extending through the region of the valve seat;
    a valve head on the end of the valve stem extending through the region of the valve seat, the valve head being adapted to have sealing engagement with the valve seat to close the through chamber;
    biasing means for urging the valve stem and valve head in the downstream direction to normally hold the valve head away from the valve seat;
    a flexible diaphragm secured to the valve casing and to the valve stem at a point intermediate the first bore and the valve head, the diaphragm dividing the through chamber into a first region communicating with the first bore only and a second region communicating with the inlet and outlet ports and extending across the valve seat; and
    the casing being provided with a second bore axially aligned with and communicating with the first bore but of greater diameter than the first bore, the end of the second bore opposite the first bore being closed, the valve stem extending into the second bore, and a piston being connected to the end of the valve stem within the second bore, the first region of the casing chamber and the bores being substantially filled with oil, sufficient clearance being provided between the valve stem and first bore and between the piston and the second bore to permit oil flow at a controlled rate.

2. The air relief valve according to claim 1 wherein the biasing means comprises a coil spring acting between the closed end of the second bore and the end of the valve stem extending into the second bore.

3. The air relief valve according to claim 2 further including adjustment means carried by the closed end of the second bore for varying the force applied by the spring to the valve stem.

* * * * *